(12) United States Patent
Kim et al.

(10) Patent No.: US 8,880,777 B2
(45) Date of Patent: Nov. 4, 2014

(54) COMPLEX MEMORY DEVICE AND I/O PROCESSING METHOD USING THE SAME

(75) Inventors: Jin-kyu Kim, Seoul (KR); Hyung-gyu Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 739 days.

(21) Appl. No.: 12/533,433

(22) Filed: Jul. 31, 2009

(65) Prior Publication Data

US 2010/0191898 A1    Jul. 29, 2010

(30) Foreign Application Priority Data

Jan. 23, 2009  (KR) ................ 10-2009-0006178

(51) Int. Cl.
*G06F 12/02* (2006.01)

(52) U.S. Cl.
CPC .... *G06F 12/0246* (2013.01); *G06F 2212/7201* (2013.01); *G06F 2212/7203* (2013.01)
USPC ................. 711/103; 711/104; 711/E12.008

(58) Field of Classification Search
USPC .......................... 711/103, E12.083
See application file for complete search history.

(56) References Cited

U.S. PATENT DOCUMENTS

| 5,696,917 | A | * | 12/1997 | Mills et al. ................ 711/1 |
| 5,937,423 | A | * | 8/1999 | Robinson ................ 711/103 |
| 6,026,465 | A | * | 2/2000 | Mills et al. ................ 711/103 |
| 6,292,874 | B1 | | 9/2001 | Barnett |
| 6,385,688 | B1 | * | 5/2002 | Mills et al. ................ 711/103 |
| 6,564,285 | B1 | * | 5/2003 | Mills et al. ................ 711/103 |
| 6,990,044 | B2 | | 1/2006 | Kang |
| 7,127,579 | B2 | | 10/2006 | Zimmer et al. |
| 7,562,202 | B2 | * | 7/2009 | Potteiger ................ 711/165 |
| 7,689,761 | B2 | * | 3/2010 | Yim et al. ................ 711/103 |
| 8,041,884 | B2 | * | 10/2011 | Chang ................ 711/103 |
| 2005/0251617 | A1 | * | 11/2005 | Sinclair et al. ................ 711/103 |
| 2006/0026211 | A1 | * | 2/2006 | Potteiger ................ 707/200 |
| 2007/0016719 | A1 | | 1/2007 | Ono et al. |
| 2007/0038808 | A1 | | 2/2007 | Yim et al. |
| 2008/0270680 | A1 | * | 10/2008 | Chang ................ 711/103 |
| 2009/0144501 | A2 | * | 6/2009 | Yim et al. ................ 711/120 |
| 2009/0203430 | A1 | * | 8/2009 | Peek ................ 463/25 |
| 2010/0023681 | A1 | * | 1/2010 | Sinclair et al. ................ 711/103 |
| 2010/0153630 | A1 | * | 6/2010 | Yim et al. ................ 711/103 |

FOREIGN PATENT DOCUMENTS

| JP | 2005-301591 | 10/2005 |
| KR | 10-2002-0039374 | 5/2002 |
| KR | 10-2004-0034660 | 4/2004 |
| KR | 10-2004-0054936 | 6/2004 |
| KR | 10-2006-0091358 | 8/2006 |
| KR | 10-2007-0008403 | 1/2007 |
| WO | WO 2007058617 A1 * | 5/2007 |

* cited by examiner

*Primary Examiner* — Kevin Verbrugge
(74) *Attorney, Agent, or Firm* — Volentine & Whitt, PLLC

(57) ABSTRACT

A non-volatile mass storage memory and an input/output processing method using the memory are provided. The memory device includes a storage unit including a non-volatile random access memory and a flash memory and a controller to control the storage to process an input/output request. Accordingly, system memories having different purposes and functionalities, such as a flash memory and a dynamic random access memory (DRAM), may be integrated with each other.

15 Claims, 5 Drawing Sheets

COMPLEX MEMORY DEVICE AND I/O PROCESSING METHOD USING THE SAME

CROSS REFERENCE TO RELATED APPLICATION(S)

This application claims the benefit under 35 U.S.C. §119 (a) of a Korean Patent Application No. 10-2009-0006178, filed on Jan. 23, 2009, the disclosure of which is incorporated herein in its entirety by reference for all purposes.

BACKGROUND

1. Field

The following description relates to a memory, and more particularly, to a configuration of a non-volatile mass storage memory and an input/output processing method using the mass storage non-volatile memory.

2. Description of the Related Art

Generally, an embedded system uses a dynamic random access memory (DRAM) as a main memory to run software, a NOR flash memory to store and execute codes, and a NAND flash memory to store user data.

DRAM provides comparably fast read/write speed and enables byte-access, but because DRAM is a volatile memory, power consumption may be substantially large due to a regular refreshing process. Accordingly, DRAM is generally used to store read/write (R/W) data of software.

NOR flash memory is a non-volatile memory that enables byte access. While NOR flash memory has as a fast read speed, write speed is comparably slow. As a flash memory, it is also subject to the erase-before-write limitation. Therefore, NOR flash memory is generally used to perform execute-in place (XIP) and to store codes whose updates are not necessary.

NAND flash memory typically only supports input/output (I/O) processing in units of pages (usually 2 KB), and thus it is generally not used to execute codes or store software R/W data. However, due to its characteristics including the fast R/W speed in transmitting mass data, inexpensive costs and high capacity, NAND flash memory is generally used to store user data.

As described above, since various memories are utilized in different ways and have different functionalities, designing a system including these various memories increases design complexity as well as manufacturing costs.

SUMMARY

In one general aspect, there is provided a complex memory device including a storage unit including a non-volatile random access memory (RAM) and a flash memory, and a controller to process an input/output (I/O) request from a host, to control the non-volatile RAM and the flash memory to hierarchically operate, and to provide a dual interface according to whether the I/O request is in units of bytes or blocks.

The controller may perform address translation and demand paging between the non-volatile RAM and the flash memory.

In response to the I/O request being in units of bytes, the controller may process the I/O request in the non-volatile RAM where data requested by the I/O request is present in the non-volatile RAM, and the controller may load the requested data from the flash memory to the non-volatile RAM to process the I/O request in the non-volatile RAM where the requested data is not present in the non-volatile RAM.

In response to the non-volatile RAM not including sufficient space to store the requested data loaded from the flash memory, the controller may flush some of data stored in the non-volatile RAM to the flash memory.

In response to the I/O request being in units of blocks, the controller directly processes the I/O request in the flash memory without passing through the non-volatile RAM.

The controller may provide the host with an address space which is divided into a byte access area and a block access area.

The non-volatile RAM may be one of a ferroelectric random access memory (FRAM), a magnetic random access memory (MRAM), and a phase-change random access memory (PRAM).

The flash memory may be a NAND-type flash memory.

The non-volatile RAM may have a pinned area with relatively high access frequency In another general aspect, there is provided a method of processing input/output (I/O) in a complex memory device including a non-volatile random access memory (RAM) and a flash memory, the method including determining whether an I/O request from a host is in units of bytes or blocks, where the I/O request is in units of bytes, hierarchically processing the I/O request in the non-volatile RAM or in the flash memory, and where the I/O request is in units of blocks, processing the I/O request in the flash memory.

The hierarchically processing of the I/O request may include determining whether data requested by the I/O request is present in the non-volatile RAM, where the requested data is present in the non-volatile RAM, processing the I/O request in the non-volatile RAM, and where the requested data is not present in the non-volatile RAM, processing the I/O request after loading the requested data from the flash memory to the non-volatile RAM.

The method of processing I/O may further include flushing some of data stored in the non-volatile RAM to the flash memory when the non-volatile RAM has not sufficient space to store the requested data loaded from the flash memory.

The non-volatile RAM may be one of a ferroelectric random access memory (FRAM), a magnetic random access memory (MRAM), and a phase-change random access memory (PRAM).

The flash memory may be a NAND-type flash memory.

Other features will become apparent to those skilled in the art from the following detailed description, which, taken in conjunction with the attached drawings, discloses exemplary embodiments of the invention.

Figure 1:
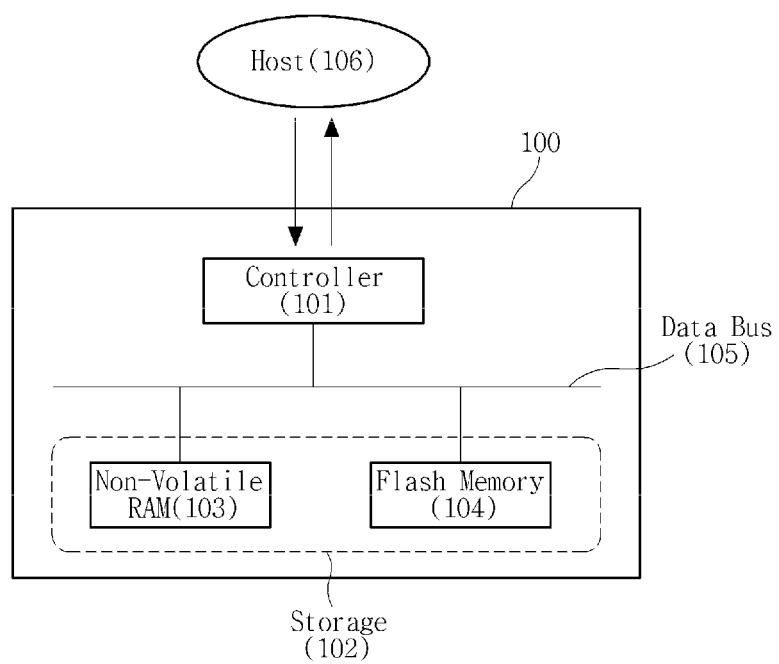
FIG. 1 is a block diagram illustrating an exemplary complex memory device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves those of ordinary skill in the art. Descriptions of well-known functions and structures are omitted to enhance clarity and conciseness.

FIG. 1 is a block diagram illustrating an exemplary complex memory device 100. Referring to FIG. 1, the complex memory device 100 may store various types of data, and may process an input/output request from a host 106. The complex memory device 100 may be configured as a single chip to be communicatably connected to a host 106. In addition, the complex memory device 100 may be implemented inside a computing device which stores and processes data, or may be provided separately to be connectable to and/or detachable from the computing device. Examples of the computing device may include a computer, a mobile phone, a digital camera, and the like.

The complex memory device 100 may include a controller 101 and a storage unit 102.

The storage unit 102 may include at least two different types of memory units. For example, a non-volatile random access memory (RAM) 103 and a flash memory 104 are connected via a data bus 105 to form the storage unit 102.

The non-volatile RAM 103 refers to a storage device which retains data stored within it even where the power is not supplied thereto. Examples of the non-volatile RAM 103 may include a ferroelectric random access memory (FRAM), a magnetic random access memory (MRAM), and a phase-change random access memory (PRAM). FRAM is a random access memory similar in construction to DRAM, which is generally used as a main memory unit of a computer, but uses a ferroelectric layer to achieve non-volatility. MRAM is possible to retain data stored within it, like the FRAM. PRAM uses a unique characteristic of chalcogenide, which is switched between two states, amorphous and crystalline, where heat is applied thereto.

The flash memory 104 may be a solid-state device (SDD) that may store data without mechanical disk rotation, unlike a hard disk drive (HDD). There are two types of flash memories, a NAND type and a NOR type, and the flash memory 104 in FIG. 1 may be of NAND type, which may store a large amount of data.

The controller 101 processes an input/output (I/O) request from the host 106, and controls the non-volatile RAM 103 and the flash memory 104 to hierarchically operate. For example, the host 106 issues an I/O request, the controller 101 may control the non-volatile RAM 103 and the flash memory 104, as will be described below.

First, where an I/O request is issued, the controller 101 checks whether data requested by the I/O request is present in the non-volatile RAM 103, and obtains a physical address of the data in the non-volatile RAM 103. In this case, an address mapping table of a virtual memory manager may be referred to in order to check the presence of the data and to obtain the physical address.

If the requested data is present in the non-volatile RAM 103, the data is input to or output from the non-volatile RAM 103. If the data is not present in the non-volatile RAM 103, a storing address of the data in the flash memory 104 is identified based on the address mapping table, and the corresponding data is loaded from the flash memory 104 to the non-volatile RAM 103.

If the non-volatile RAM 103 runs out of space to store new data, the controller 101 may flush some of data (e.g. victim) stored in the non-volatile RAM 103 to the flash memory 104 to obtain free space.

Additionally, the controller 101 may provide a dual interface according to a unit of the I/O request, a unit of byte or block. That is, where an access in units of only bytes is supported, victim flush may occur too frequently in the non-volatile RAM 103, and thus an address space may be divided into a byte-access region and a block-access region.

For example, where the I/O request is processed in units of bytes, the controller 101 provides an interface to allow the non-volatile RAM 103 and the flash memory 104 operate hierarchically, as described above. Alternatively, where the I/O request is processed in units of blocks, the controller 101 provides an interface such that the I/O request may be processed directly by the flash memory 104 without passing through the non-volatile RAM 103, unlike the byte-based access.

Figure 2:
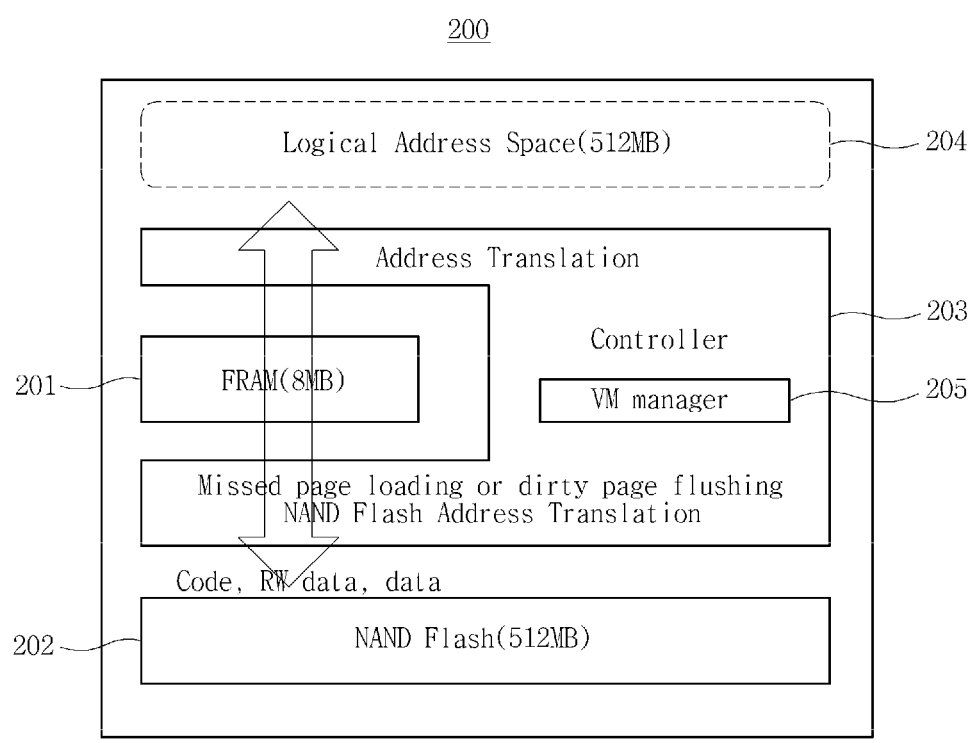
FIG. 2 is a block diagram illustrating another exemplary complex memory device.

FIG. 2 is a block diagram illustrating another exemplary complex memory device 200. Referring to FIG. 2, the complex memory device 200 includes an FRAM 201 and a NAND flash 202 which are hierarchically arranged. That is, the FRAM 201 is disposed at a level 1, the NAND flash 202 is disposed at a level 2, and a controller 203 is interposed between the FRAM 201 and the NAND 202 to perform demand paging.

The controller 203 manages the FRAM 201 and the NAND flash 202 hierarchically to process an I/O request from a host. For example, where a host requests data, it is checked whether the requested data is present in the FRAM 201. In response to the data being present in the FRAM 201, a physical address on which the data is stored is obtained and input/output of the data is processed. In response to the requested data not being present in the FRAM 201, the corresponding data is loaded from the NAND flash 202 to the FRAM 201 and then the I/O process is performed.

For example, the controller 203 may provide a logical address space 204 of 512 MB to the host or an operating system of the host. In addition, the size of the NAND flash 202 may be 512 MB, which is the same as the logical address space 204, and the size of the FRAM 201 may be 8 MB. A virtual memory manager 205 provided in the controller 203 is possible to check whether the requested data is present in the FRAM 201 with reference to an address mapping table, and obtain the physical address of the requested data. As the result, a user is enabled to use the complex memory device 200 as a non-volatile random access memory device of 512 MB.

In FIG. 2, the FRAM 201 may be divided into two areas. For example, a particular area of the FRAM 201 which is frequently used, (i.e. accessed) may be designated as a pinned area, and the remaining area may be designated as an unpinned area. In this case, the controller 203 may assign an area of the logical address space to the host, such that the area of the logical address space corresponds to the pinned area.

Figure 3:
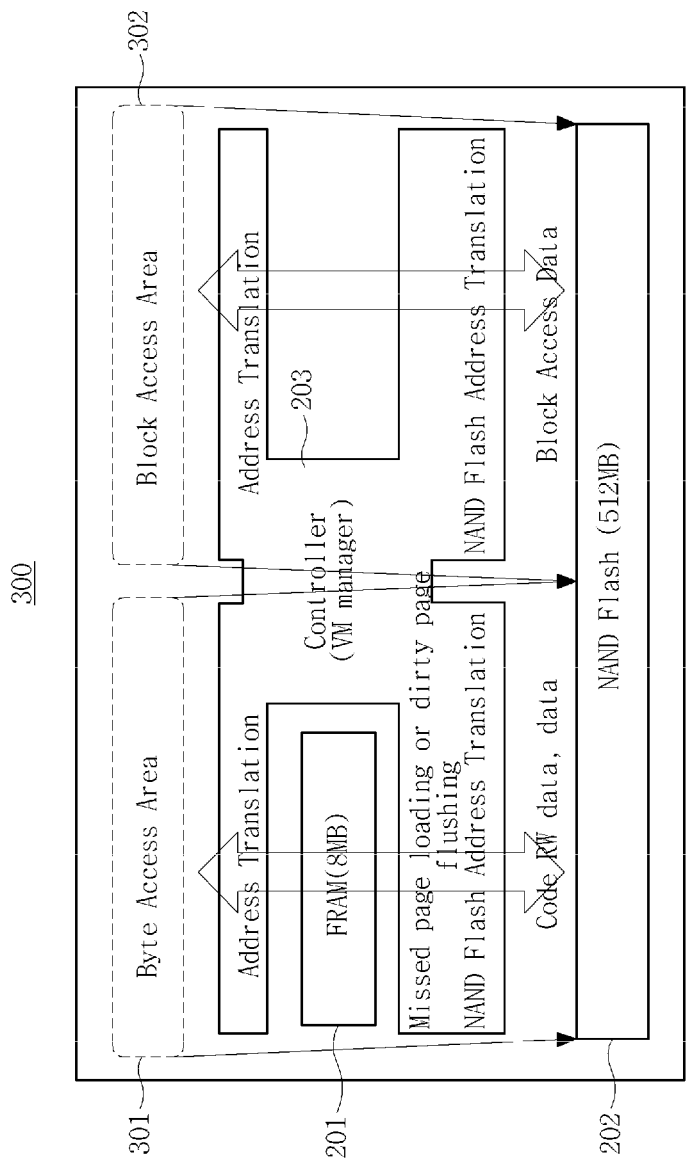
FIG. 3 is a block diagram illustrating another exemplary complex memory device.

FIG. 3 is a block diagram illustrating another exemplary complex memory device 300. Referring to FIG. 3, the complex memory device 300 may include an FRAM 201, a NAND flash 202, and a controller 203, similar to the complex memory device 200 of FIG. 2. The controller 203 provides a host with a logical address space, which may be divided into a byte-access area 301 and a block-access area 302.

For example, the host may issue I/O requests in units of bytes or blocks. The controller 203 may provide a dual interface according to the units of the I/O request, the request in units of bytes or in units of blocks.

In the byte-based access, the controller 203 is possible to perform the I/O process in the same manner as described with reference to FIG. 2. Moreover, in the block-based access, it is possible to perform the I/O process directly in the NAND flash 202 without passing through the FRAM 201.

For example, the controller 203 which receives the I/O request to be processed in units of blocks may issue a command using a register interface to directly access a register, and obtain the physical address from the NAND flash 202 to perform I/O process.

Figure 4:
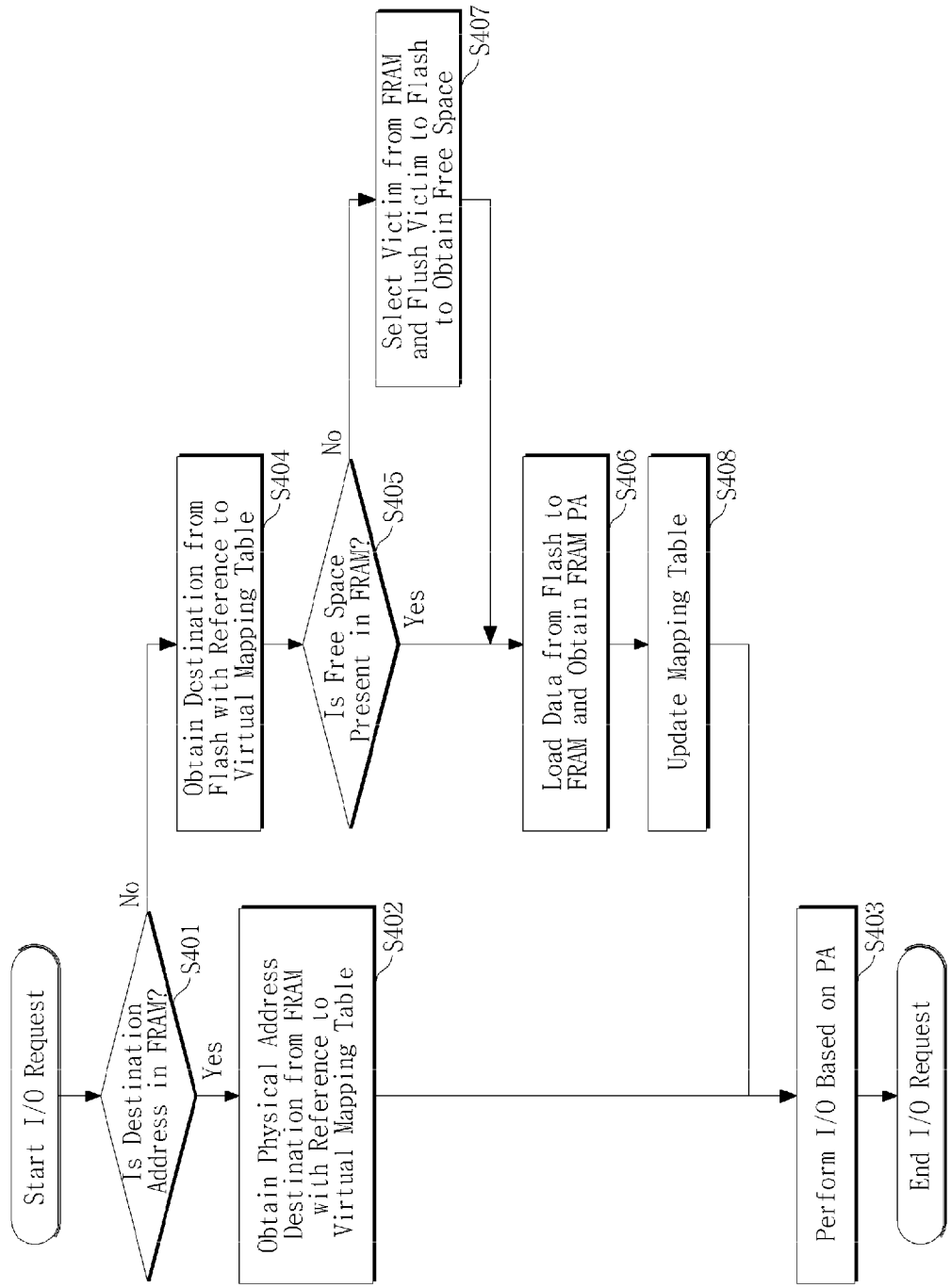
FIG. 4 is a flowchart illustrating an exemplary method of processing input/output (I/O).

FIG. 4 is a flowchart illustrating an exemplary method of processing input/output (I/O). This method may be implemented using the complex memory device illustrated in FIG. 2.

Referring to FIG. 4, a non-volatile RAM and a flash memory may be hierarchically controlled to perform I/O processing.

Where an I/O request is received from a host, it is determined whether a destination address is in the non-volatile RAM (operation S401).

In response to the determination result indicating that the destination address is located in the non-volatile RAM, a physical address corresponding to the destination address is obtained from the non-volatile RAM. Consequently, I/O processing is performed on the non-volatile RAM based on the obtained physical address (operation S403).

In response to the determination result of operation S401 indicating that the destination address is not present in the non-volatile RAM, a corresponding physical address is obtained from the flash memory with reference to the address mapping table (operation S404). Then, it is determined whether there is a free space in the non-volatile RAM (operation S405). In response to a determination that a free space exists, data is loaded from the flash memory to the non-volatile RAM, and a physical address of corresponding data is obtained (operation S406). The address mapping table is updated (operation S408), and operation S403 is performed again. In response to the determination result of operation S405 indicating that the free space is not present in the non-volatile RAM, some of data stored in the non-volatile RAM is selected as victim, and the selected victim is flushed to the flash memory to achieve the free space.

Figure 5:
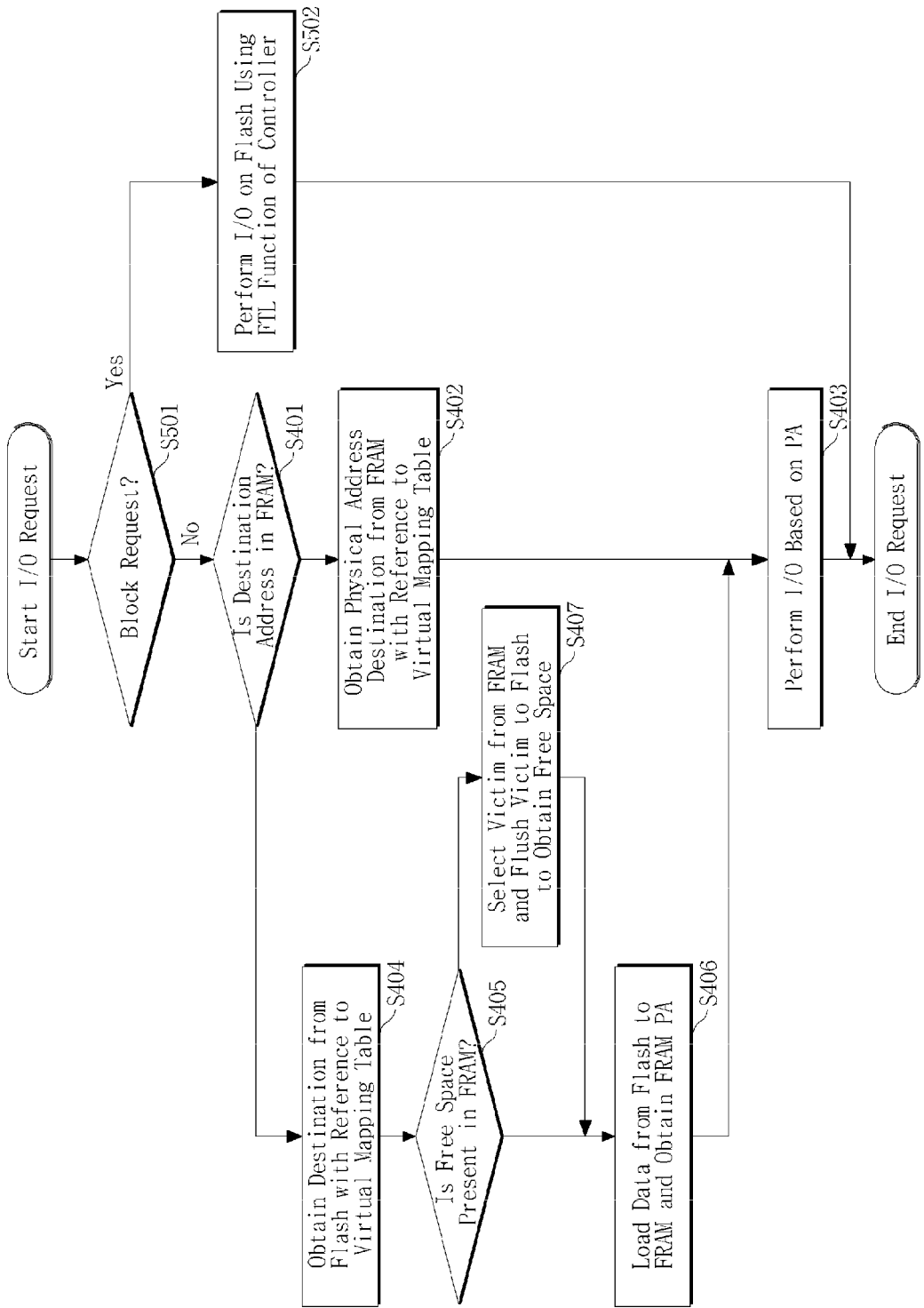
FIG. 5 is a flowchart illustrating another exemplary method of processing I/O.

FIG. 5 is a flowchart illustrating another exemplary method of processing I/O. This method may be implemented using the complex memory device illustrated in FIG. 3. Also, the method may provide a dual interface to support both byte-based access and block-based access.

Referring to FIG. 5, where an I/O request is received from a host, it is determined whether the received I/O request is in units of either bytes or blocks.

In response to the determination result of operation S501 indicating that the I/O request is in units of bytes, operations S401 through S407 may be performed as described with reference to FIG. 4.

In response to the determination result of operation S501 indicating that the I/O request is in units of blocks, I/O processing is performed in the flash memory by use of flash translation layer (operation S502).

As described above, a system memory may be utilized as a mass-storage non-volatile random access memory, and each memory may be divided into regions such as a region to code XIP, an R/W region, and a data storing region according to various purposes and functionalities.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

Flash memory devices and/or memory controllers according to the examples described above may be included in various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of interface protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a DVD, a router, and a Global Positioning System (GPS).

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A complex memory device, comprising:
   a storage unit comprising a non-volatile random access memory (RAM) and a flash memory; and
   a controller to process an input/output (I/O) request from a host, to determine whether the I/O request is in units of bytes or blocks, and to automatically execute one of a first or second interface protocol between the host and the storage unit according to whether the I/O request is in the units of bytes or blocks,
   wherein, each time the I/O request is in the units of bytes the controller automatically executes the first interface protocol in which the I/O request is hierarchically processed such that the controller determines whether data requested by the I/O request is present in the non-volatile RAM, and if the data is not present in the non-volatile RAM, the data is loaded from the flash memory to the non-volatile RAM, and
   each time the I/O request is in units of blocks the controller automatically executes the second interface protocol by issuing a command using a register interface to directly access a register corresponding to a flash memory such that the I/O request is processed directly by the flash memory without passing the I/O request through the non-volatile RAM, wherein the second interface protocol is devoid of any determination as to whether the data requested by the I/O request is present in the non-volatile RAM.

2. The complex memory device of claim 1, wherein the controller performs address translation and demand paging between the non-volatile RAM and the flash memory.

3. The complex memory device of claim 1, wherein in response to the I/O request being in units of bytes, the controller processes the I/O request in the non-volatile RAM where data requested by the I/O request is present in the non-volatile RAM, and the controller loads the requested data from the flash memory to the non-volatile RAM to process the I/O request in the non-volatile RAM where the requested data is not present in the non-volatile RAM.

4. The complex memory device of claim 3, wherein in response to the non-volatile RAM not including sufficient space to store the requested data loaded from the flash memory, the controller flushes some of data stored in the non-volatile RAM to the flash memory.

5. The complex memory device of claim 1, wherein the controller provides the host with an address space which is divided into a byte access area and a block access area.

6. The complex memory device of claim 1, wherein the non-volatile RAM is one of a ferroelectric random access memory (PRAM), a magnetic random access memory (MRAM), and a phase-change random access memory (PRAM).

7. The complex memory device of claim 1, wherein the flash memory is a NAND-type flash memory.

8. The complex memory device of claim 1, wherein the non-volatile RAM has a pinned area with relatively high access frequency.

9. The complex memory device of claim 1, wherein the flash memory is a solid-state disk (SSD) comprising at least one NAND-type flash memory.

10. A method of processing input/output (I/O) in a complex memory device, the method comprising:
    determining whether an I/O request from a host is in units of bytes or blocks;
    automatically executing, by a controller, one of first and second interface protocols between the host and a storage device according to whether the I/O request is in the units of bytes or blocks, the storage device including a non-volatile random access memory (RAM) and a flash memory;
    wherein the controller automatically executes the first interface protocol each time the I/O request is determined to be in the units of bytes, the first interface protocol including hierarchically processing the I/O request in the non-volatile RAM and in the flash memory such that it is determined whether data requested by the I/O request is present in the non-volatile RAM, and if the data is not present in the nonvolatile RAM, the data is loaded from the flash memory to the non-volatile RAM; and
    wherein the controller automatically executes the second interface protocol each time the I/O request is in units of blocks, the second interface by issuing a command using a register interface to directly access a register corresponding to the flash memory such that the I/O request is processed directly in the flash memory without passing the I/O request through the non-volatile RAM, wherein the second interface protocol is devoid of any determination as to whether the data requested by the I/O request is present in the non-volatile RAM.

11. The method of claim 10, wherein the hierarchically processing of the I/O request comprises:
    determining whether data requested by the I/O request is present in the non-volatile RAM;
    in response to the requested data being present in the non-volatile RAM, processing the I/O request in the non-volatile RAM; and
    in response to the requested data being not present in the non-volatile RAM, processing the I/O request after loading the requested data from the flash memory to the non-volatile RAM.

12. The method of claim 11, further comprising flushing some of data stored in the non-volatile RAM to the flash memory in response to the non-volatile RAM not including sufficient space to store the requested data loaded from the flash memory.

13. The method of claim 10, wherein the non-volatile RAM is one of a ferroelectric random access memory (FRAM), a magnetic random access memory (MRAM), and a phase-change random access memory (PRAM).

14. The method of claim 10, wherein the flash memory is a NAND-type flash memory.

15. The method of claim 10, wherein the flash memory is a solid-state disk (SSD) comprising at least one NAND-type flash memory.

* * * * *